P. B. THRASHER.
STOCK WATERER.
APPLICATION FILED FEB. 20, 1920.

1,395,750.

Patented Nov. 1, 1921.

INVENTOR
P. B. Thrasher.
BY
ATTORNEY

UNITED STATES PATENT OFFICE.

PAUL B. THRASHER, OF SIOUX CITY, IOWA, ASSIGNOR TO WILLIAM WARNOCK COMPANY, OF SIOUX CITY, IOWA, A CORPORATION OF IOWA.

STOCK-WATERER.

1,395,750.  Specification of Letters Patent.  Patented Nov. 1, 1921.

Application filed February 20, 1920. Serial No. 360,258.

*To all whom it may concern:*

Be it known that I, PAUL B. THRASHER, a citizen of the United States, and a resident of Sioux City in the county of Woodbury and State of Iowa, have invented certain new and useful Improvements in Stock-Waterers, of which the following is a specification.

The invention has for its primary object the production of an improved non-freezable stock watering device.

A further object of the invention is the production of a stock-waterer embodying an outer jacket having drinking compartments and a water supply tank removably supported within the jacket and so constructed as to automatically supply the drinking compartments.

Furthermore the invention contemplates a stock watering device embodying an outer jacket having a trough which extends diametrically through the jacket and protrudes from the sides thereof and above which is mounted a supply tank having in its bottom above the trough, a float controlled valve for admitting water from the tank into the trough, the tank being disposed in spaced relation to the walls of the jacket and the bottom thereof conical to permit unobstructed operation of the valve and provide a large surface which is heated from suitable means positioned in the jacket below the trough.

Still a further object of the invention is the production of an improved stock waterer, simple and inexpensive in construction, yet stable and throughly efficient in operation.

With these and other objects in view, the invention consisting in the construction, combination and novel arrangement of parts, will be fully understood from the following description, reference being had to the accompanying drawings, which form a part of this application and in which like characters of reference indicate corresponding parts throughout the several views, of which,—

Figure 1:
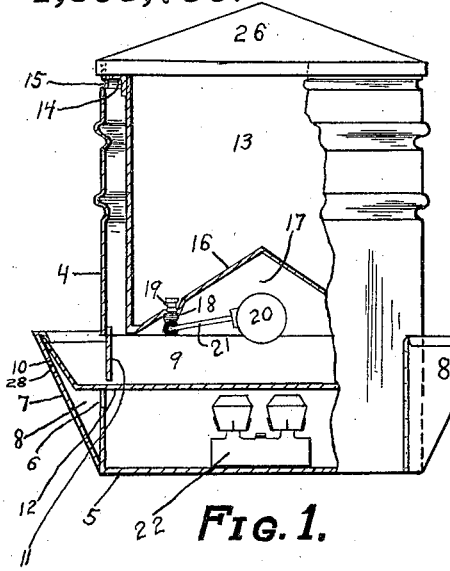
Figure 1 is a front elevation of the device partially shown in section.
Figure 2:
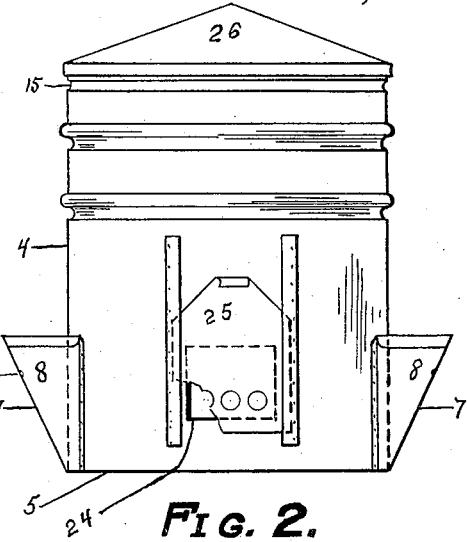
Fig. 2 is a front elevation thereof with the door cut away.
Figure 3:
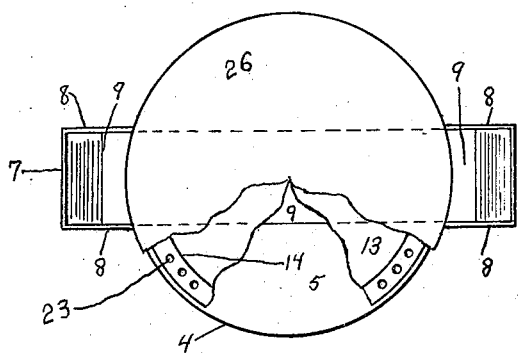
Fig. 3 is a plan thereof with parts cut away.

While I have illustrated and hereinafter described the preferred embodiment of the invention, I would not be understood as being limited to the specific structure chosen for illustration, for various alterations and modifications may be made in the details of construction and arrangement of parts disclosed, without departing from the spirit and scope of the invention as defined in the appended claim.

Referring, now, to the illustrations, the device consists, preferably, of a cylindrical jacket, 4, having a bottom, 5, and provided in diametrically opposite sides with openings, 6, positioned a distance above the bottom. The portion of the jacket walls formed with the openings, 6, are provided with pockets consisting of walls, 7, inclined outwardly from the bottom; and front and rear walls, 8, secured to the jacket, the upper edge of said walls being substantially in the same plane as the upper edges of the openings, 6.

9 is a trough, the end portions of which protrude through the openings, 6, and the end walls, 10, of which are inclined and rest against the pocket walls, 7, whereby the trough is supported within the jacket. The end portions of the trough are separated from the interior thereof by partitions suitably positioned to prevent entrance from the drinking compartments into the portion of the trough within the jacket of floating refuse or foreign matter and between the partition, 11, and the bottom of the trough is provided a passage, 12, whereby water from the inner portion of the trough enters the end portions or drinking compartments.

Within the jacket and above the trough is a supply tank, 13, removably supported upon the trough and provided at its upper edge with an annular flange, 14, which rests upon an internal rib, 15, in the jacket wall. The tank is provided with a concavo-convex or conical bottom, 16, which provides a space, 17, between the tank and the trough. Near one side of the tank and in the bottom, 16, thereof, is provided an outlet opening, 18, in which is a suitable valve, 19, controlled by a float, 20, on an arm, 21, operatively connected with the valve. The float is positioned in the trough and free to rise and fall within the space, 17.

Below the trough is a suitable heating element as an oil burner, 22, the heat from which encompasses the tank and trough and enters the pocket below the end portions of the trough.

The flange, 14, is provided with draft openings, 23, and the front of the jacket is provided with a hand hole, 24, normally closed by a suitable door, 25. A suitable cover, 26, is removably mounted on the device.

It will also be observed that the conical bottom, 16, not only provides a float chamber therebelow, but also increases the heating surface of the tank and permits the heat to warm the center of the volume of water within the tank.

Having thus described my invention what I claim as new and desire to secure by Letters Patent of the United States, is,—

A stock-waterer comprising a jacket, a trough extending across and protruding through the walls of the jacket, a water supply tank resting upon the trough, the bottom of the tank being provided with a valved opening above the trough, and raised to provide a space between the tank and trough and afford a large heating surface, a float in the trough free to move vertically in said space and operatively connected with the valve, and a heating device in the lower part of the jacket.

In testimony whereof I have hereunto set my hand this 8th day of Sept., 1919.

PAUL B. THRASHER.